UNITED STATES PATENT OFFICE.

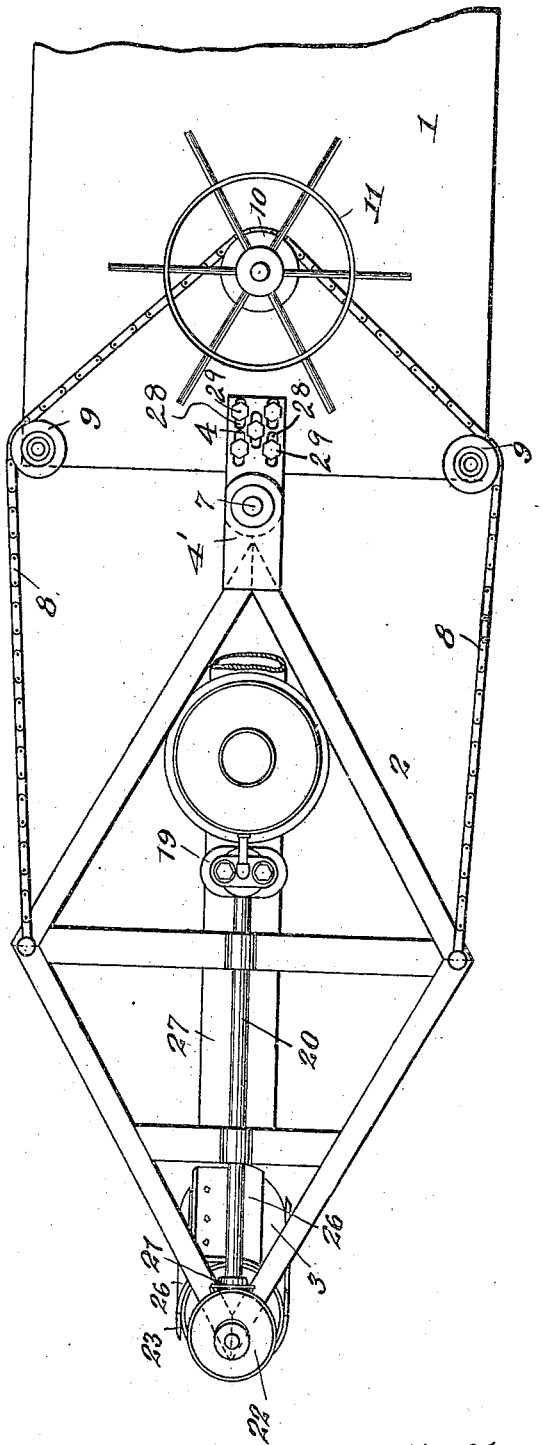

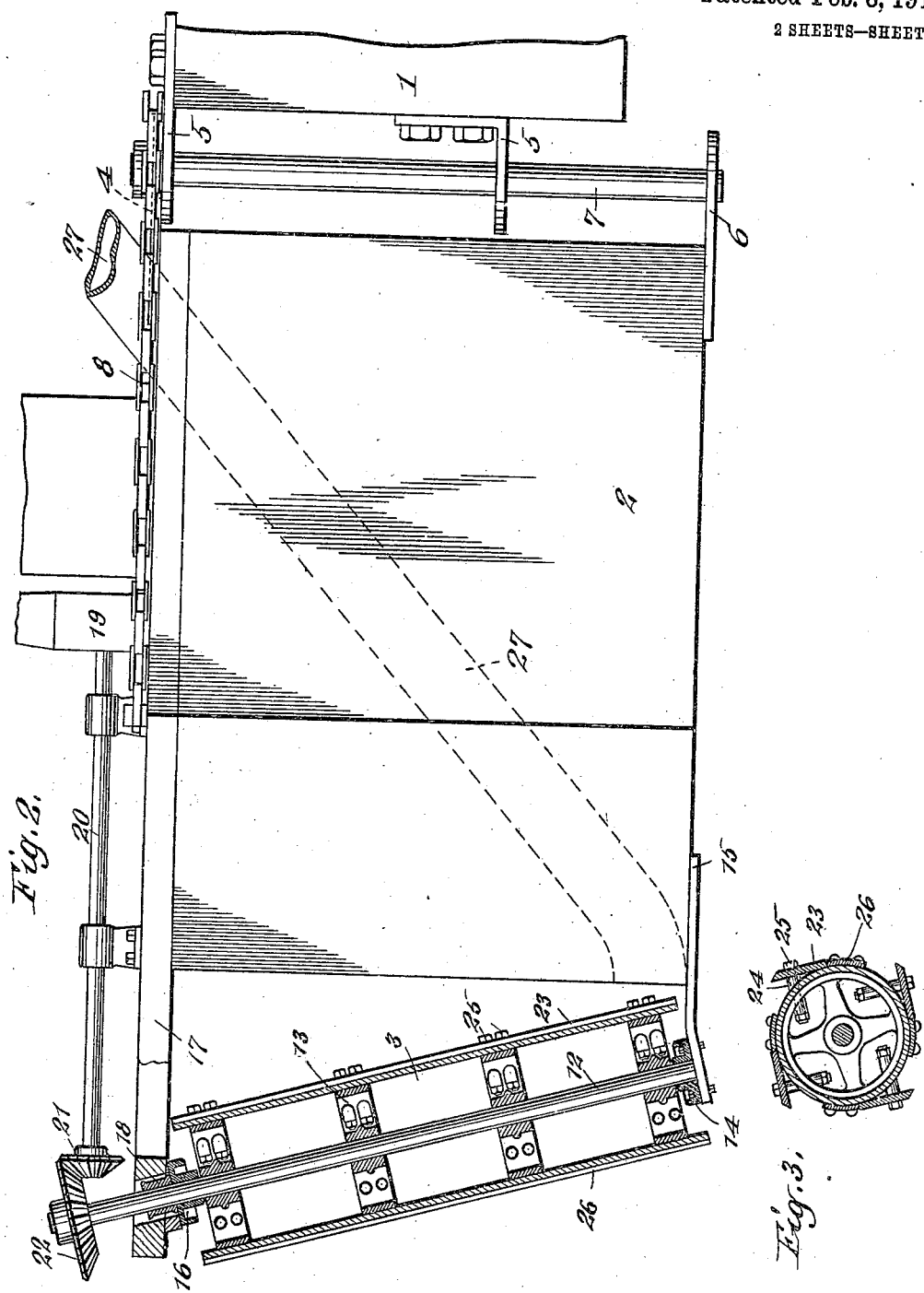

WALTER R. COMFORT, OF NEW YORK, N. Y.

DREDGING APPARATUS.

948,722.     Specification of Letters Patent.     Patented Feb. 8, 1910.

Application filed March 10, 1909. Serial No. 482,432.

*To all whom it may concern:*

Be it known that I, WALTER R. COMFORT, a citizen of the United States, residing at 32 New Chambers street, New York city, New York, have invented new and useful Improvements in Dredging Apparatus, of which the following is a specification.

My invention relates to dredging machines of the type which is designed to cut a canal immediately in front of itself of sufficient depth to float its own body and to advance step by step as the excavation takes place.

The invention includes means which are particularly simple in construction and highly efficient in use for accomplishing the purpose outlined, and of such construction as to permit the depth of excavation to be varied, and also to permit of the inclination of the cutting implement being varied, whereby it may be adjusted to operate in different oblique planes more or less approaching the perpendicular.

The invention includes the combination and arrangement of parts to be hereinafter described and particularly pointed out in the claims.

One embodiment of the invention is illustrated in the accompanying drawings, in which—

Figure 1 is a plan view of the machine, the main float being broken away. Fig. 2 is a side elevation with the cutting implement shown in sectional elevation; and Fig. 3 is a detail cross sectional view of the cutting implement.

The invention includes generally a main float or barge, a supplemental float, a cutting implement supported on the supplemental float, driving means for the cutting implement also mounted on the supplemental float, and a connection between the main and supplemental floats for supporting the latter from the former, and for permitting the supplemental float to be raised and lowered relatively to the main float, for varying the depth of the excavation, and for permitting the supplemental float to be swung laterally, for giving the cutting implement the necessary lateral sweep, and it further includes means for swinging the supplemental float laterally. It further includes means for varying the inclination of the cutting implement.

In the accompanying drawings, the main float is designated 1 and may be of any desired size and of any known or approved construction.

The supplemental float is designated 2 and is preferably of diamond shape, as viewed in plan, is preferably arranged in advance of the main float, with the rear acute angle thereof arranged slightly in advance of the front edge of the main float, and approximately centrally thereof.

The cutting implement is designated 3 and is preferably mounted in advance of the front acute angle of the supplemental float, and is canted slightly out of a perpendicular or vertical position.

The float 2 may be coupled to the float 1 by any suitable means which will permit of the former being raised and lowered in respect to the latter, and which will also permit of the float 2 being swung laterally in respect to the float 1. The illustrated coupling means includes two plates or brackets, 4 and 5, secured to the float 1 and projecting in advance of the front side thereof and provided with registering openings, and a frame projecting rearwardly from the rear acute angle of the float 2, such frame comprising plates 4' and 6, and a suitable rod 7 which is held within the registering openings and constitutes a pivot upon which the float 2 swings, in its lateral movement. The rod 7 slides in the plates 4, 5, as the float 2 is raised and lowered as before referred to.

The raising and lowering of the float 2 is preferably effected by providing suitable removable ballast, which when loaded upon the float causes it to sink to the desired depth, and when removed permits the float to rise to the desired extent.

For swinging the supplemental float laterally any desired means may be employed. The means herein illustrated comprises a chain 8 secured at its respective ends to the float 2 adjacent to the respective obtuse-angles thereof, such chain being guided around idlers 9 and around a tooth wheel 10, controlled by a handwheel 11. The tooth wheel 10 engages with the links of the chain 8 and by shifting the wheel 11 the chain 8 is shifted so as to swing the float 2 laterally, as may be desired.

The cutting implement 3 preferably includes a barrel or tubular cylinder having a plurality of sets of knives arranged around the periphery thereof, such sets being suitably spaced from one another. The barrel is carried by a suitable shaft 12, to which it is connected through the intermediary of suitable spiders, or rings 13, bolted to the wall of the barrel and provided with spokes running to hubs rigidly attached to, or suitably keyed upon the shaft 12. The rings or spiders 13 are arranged in alinement with the sets of knives and serve to suitably strengthen the barrel and provide a rigid support for the knives in addition to providing means for attaching the barrel to the shaft 12. The shaft 12 at its lower end is stepped into a suitable bearing 14, carried by a bracket or plate 15 projecting forwardly from the float 2 at the bottom thereof and the upper end of the shaft is journaled in a bearing 16 secured to a bracket or bar 17 projecting from the float 2 at the top thereof. The shaft 12 is also provided with a collar 18, which finds a bearing upon the part 16 and serves to additionally support and sustain the shaft 12.

The cutting implement is rotated by any desired mechanism, that herein illustrated including an engine 19 mounted on the float 2, and driving mechanism interposed between the driving shaft of the engine and the shaft 12, such interposed mechanism including a transmitting shaft 20, having at the front end thereof a beveled gear 21 and an intermeshing gear 22 fixed to the upper end of the shaft 12.

Any desired construction of cutting tools or blades may be secured to the drum of the cutting implement, and this drum may be constructed in any suitable way. The construction herein illustrated has been found a very efficient one. In this construction the cylinder is made of sheet metal of suitable thickness, and the cutters or blades are bolted to the periphery thereof and extend tangentially in relation to the latter. Each cutter is in the form of a flat blade 23, having its front edge suitably beveled or sharpened and spaced from the periphery of the cylinder by a suitable space block 24, which is sleeved upon the bolt 25 employed for securing the blade to the cylinder. The space block 24 is provided with a beveled end which bears against the periphery of the cylinder and with a non-beveled opposite end which rests upon the inner face of the blade. A companion space block is sleeved upon the bolt and is interposed between the inner face of the cylinder and the under face of the nut screwed upon the bolt. An inexpensive means of providing the companion space blocks consists in taking a short cylindrical tube of the proper length, and dividing the same into two pieces by an oblique transverse cut through the middle thereof. The rear edge of each blade 23 rests against the periphery of the cylinder, and each blade is preferably supported by a backing plate 26, which is bolted to the cylinder and which contacts with the rear edge of the blade with which it is associated.

A suitable suction conduit 27 is provided and is so disposed that the mouth thereof will reach to the lower portion of the float 2 adjacent to the lower end of the cutting implement.

In order to change the inclination of the axis of the cutting implement to permit of the same operating in different planes more or less approximating the perpendicular, the entire supplemental float is preferably canted in respect to the main float, although other means may be employed for changing the inclination of the cutting tool. For the purpose of canting the supplemental float, the plate 4 is preferably so connected to the float 1 that it may be shifted lengthwise of the latter. A simple means of effecting such adjustment is that herein illustrated, wherein the plate 4 is provided with elongated slots 28 for the reception of the bolts 29 which are used to secure the plate to the float 1. As will be appreciated, by loosening the nuts of these bolts the plate 4 may be shifted lengthwise, thus changing the position of the float 2 in respect to the float 1, and thereafter the nuts are again screwed home.

The construction and operation of my dredging machine will be understood from the foregoing description, and it will be appreciated that certain of the parts and the described arrangements may be altered or changed within a large range, or substitutions made, without departing from the spirit and scope of the invention.

I claim:

1. In a machine of the class described, a main float, a supplemental float, a cutting implement carried by the supplemental float, and longitudinally shiftable means connecting said supplemental float with said main float, whereby the supplemental float may be tilted to vary the inclination of the cutting implement.

2. In a machine of the class described, a main float, a supplemental float, a cutting implement carried by the supplemental float, and means connecting said supplemental float with said main float, said means comprising a member slidingly mounted on one of said floats whereby the supplemental float may be tilted to vary the inclination of the cutting implement.

3. In a machine of the class described, a main float, a supplemental float, a cutting implement carried by said supplemental float, and means connecting said supplemental float with said main float, said means comprising a plate provided with longitudinally extending slots and members carried by one of said floats, and engaging said slots, whereby the supplemental float may be tilted to vary the inclination of the cutting implement.

4. In a machine of the class described, a main float, a supplemental float arranged in advance thereof, a cutting implement carried by the supplemental float and means connecting the main and supplemental float adapted to be shifted to vary the inclination of the cutting implement and constructed to permit of the vertical and lateral adjustment of the supplemental float.

5. In a machine of the class described, a main float, a supplemental float arranged in advance thereof, a cutting implement carried by the supplemental float, driving means therefor also carried by the supplemental float and coupling means between the main and supplemental float, comprising two plates secured to the main float and a frame secured to the supplemental float and including a bar having a sliding and pivotal connection in said two plates, one of said two plates being lengthwisely adjustable for canting the supplemental float whereby the plane of operation of the cutting implement may be changed.

6. In a machine of the class described, a cutting implement comprising a cylinder, a plurality of knives secured thereto and projecting tangentially therefrom, and spacing means between said knives and said cylinder.

7. In a machine of the class described, a cutting implement comprising a shaft, a plurality of supporting members carried thereby, and a plurality of knives extending substantially parallel to said shaft, said knives being supported by said supporting members.

8. In a machine of the class described, a shaft, a cylinder supported thereon, a plurality of knives carried by said cylinder, and projecting tangentially therefrom, said knives extending substantially parallel to said shaft.

9. In a machine of the class described, a cutting implement comprising a cylinder, a set of knives secured to the periphery of such cylinder, each knife comprising a flat blade beveled at its front end, a bolt for securing each blade to the cylinder, such bolt passing through the body portion of the blade, space blocks sleeved upon the bolt and arranged respectively between the blade and the outer periphery of the cylinder and the inner periphery of the cylinder, and the nut on the bolt, and a backing plate for each blade bolted to the cylinder and having its front edge in contact with the rear edge of the blade with which it is associated.

In testimony whereof I have signed my name to this specification in the presence of two subscribing witnesses.

WALTER R. COMFORT.

Witnesses:
S. M. Tatum,
B. B. Tatum.